United States Patent

Kawai

[11] Patent Number: 5,956,311
[45] Date of Patent: Sep. 21, 1999

[54] CD-R ERASING METHOD AND APPARATUS

[75] Inventor: Hideo Kawai, Chiba, Japan

[73] Assignee: Expert Magnetics Corp., Japan

[21] Appl. No.: 09/009,801

[22] Filed: Jan. 20, 1998

[30] Foreign Application Priority Data

Jan. 29, 1997 [JP] Japan .................................. 9-028270

[51] Int. Cl.$^6$ .................................................. G11B 7/00
[52] U.S. Cl. ............................................................ 369/100
[58] Field of Search .................................. 369/100, 124, 369/120, 32

[56] References Cited

U.S. PATENT DOCUMENTS

| 4,912,696 | 3/1990 | Feyrer et al. | 369/100 |
| 4,970,711 | 11/1990 | Martin et al. | 369/100 |
| 5,036,488 | 7/1991 | Motarjemi | 369/100 |
| 5,107,482 | 4/1992 | Goto et al. | 369/100 |
| 5,189,658 | 2/1993 | Moses | 369/100 |
| 5,195,080 | 3/1993 | Komaki et al. | 369/100 |
| 5,215,800 | 6/1993 | Daido et al. | 428/64 |
| 5,282,189 | 1/1994 | Peppers et al. | 369/100 |
| 5,620,781 | 4/1997 | Akashi et al. | 428/195 |
| 5,691,091 | 11/1997 | Chaiken et al. | 430/19 |
| 5,703,005 | 12/1997 | Torii et al. | 503/201 |

*Primary Examiner*—Nabil Hindi
*Attorney, Agent, or Firm*—Dellett and Walters

[57] ABSTRACT

To destroy data stored in CD-Rs so that no one or no technology can read the original data stored therein, unnecessary CD-Rs are heated to 80° C. to 150° C. for destroying data from the label surface of each CD-R. In this manner, data in unnecessary CD-Rs is destroyed before disposal, thereby enabling the user of CD-R to discharge them to disposing services without fear of leaking proprietary data.

8 Claims, 3 Drawing Sheets

PRESSURE/DRIVING ROLLER

PRESSURE/DRIVING
ROLLER

CD-R ERASING METHOD AND APPARATUS

FIELD OF INVENTION

The present invention relates to a method and apparatus of erasing an unnecessary CD-R to prevent leakage of data stored therein, more specifically to perfectly destroying data stored in unnecessary CD-Rs, thereby preventing important stored data from leaking.

BACKGROUND OF THE INVENTION

Before describing prior art, descriptions will be given of the CD-R, in particular its construction and how data is recorded in the CD-R.

Typically, the CD-R is a kind of CD-ROM designed to write data only once for saving the written data.

A construction of the CD-R is illustrated in FIG. 4 while a method of recording data on the CD-R is illustrated in FIG. 5. In FIG. 4, the CD-R is a round disc having an internal construction from the side to which a laser beam is directed a polycarbonate layer, an organic coloring layer, a gold plated layer, a protection layer and a printing label layer. In FIG. 5, when a laser beam is directed on the coloring layer from the polycarbonate layer, chemical reaction takes place in the coloring layer at the area to which the laser beam is directed to change the material to exhibit poor light reflecting property, thereby recording data pits. In other words, areas of the CD-R at which chemical reaction took place are considered pits which are essentially the same in meaning as pits in a CD-ROM. As a result, data is recorded as pits.

Because of the above mentioned construction and data storage principle, the CD-R has a characteristic of writing the data only once. The CD-R is therefore convenient for the user in that the written data cannot be revised. However, it is inconvenient in that the data cannot be easily erased and that companies using CD-Rs encounter difficulty in disposing of unnecessary CD-Rs. One conventional countermeasure is to scratch the surface to which a laser beam is directed for reading, thereby making it impossible to read out by a normal read-out method of the CD-R.

Unfortunately, scratching the laser directing surface of a CD-R not to be read out by a normal read-out method is not complete because the data is not basically destroyed and the data may be read out if the scratched surface is polished to remove the scratch. This suggests that the conventional erasing technique can not be used to erase the CD-Rs in which important proprietary data is stored.

On the other hand, the CD-R market is expanding rapidly and CD-Rs are forecasted to be widely used. This is the reason why it is desired to develop simple and more reliable erasing method and apparatus.

SUMMARY OF THE INVENTION

It is therefore an object of the present invention to destroy the written data so that such data cannot be reproduced by anybody or by any technology.

In order to solve the above problem, the present invention is heating unnecessary CD-Rs up to 80° C. to 150° C. for destroying the data from the label surface of such CD-Rs.

Since the data is completely destroyed from unnecessary CD-Rs before disposing, the user can discharge the disposal of unnecessary CD-Rs to outside disposing services without any fear of leaking any proprietary information.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

Now, an embodiment of the present invention will be described hereunder by reference to FIGS. 1 through 3(a)–3(c).

Figure 1:
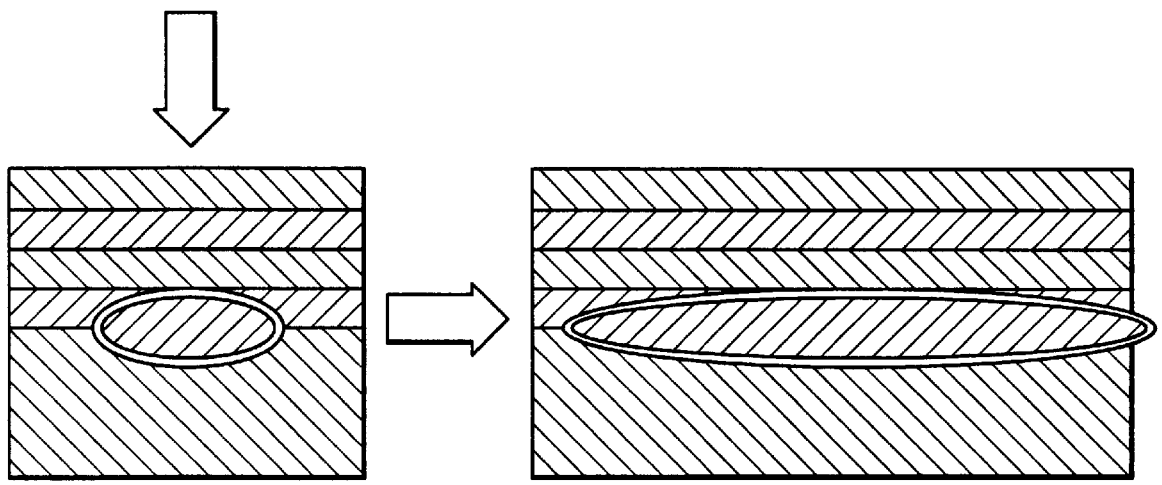
FIG. 1 illustrates a principle of describing the CD-R erasing method according to the present invention.

Illustrated in FIG. 1 is a principle drawing for describing the CD-R erasing method according to the present invention. As apparent from FIG. 1, since data pits are formed near the printed label surface, heat of 80° C. to 150° C. is applied to the printed label surface or the top surface of the CD-R. Then the periphery of the data pits is subjected to thermal change due to the heat of 80° C. to 150° C, thereby eliminating the boundaries between areas where data pits were originally present and absent. This completely destroys the stored data and makes it impossible to read out the data.

The area of destroying the data covers the entire surface of the CD-R. Since the CD-R format has generally high reproduction or correction capability to errors, destroying the data over the entire area is superior to a partial destruction in terms of disabling the data read-out capability.

Figure 2:
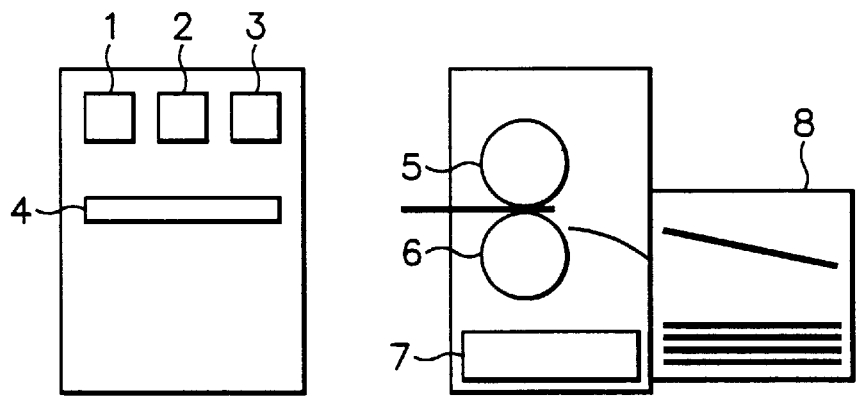
FIG. 2 illustrates a principle of describing the CD-R erasing apparatus according to the present invention.

FIG. 2 shows a principle of the CD-R erasing apparatus according to the present invention. In FIG. 2, illustrated at the left side is a simplified front view of the CD-R erasing apparatus while illustrated at the right side is a simplified internal side view of the CD-R erasing apparatus. The CD-R erasing apparatus is formed at its front with a power switch 1 for driving the apparatus, a start switch 2 for initiating the erasing of the apparatus, and a warning lamp 3 to indicate abnormal condition of the apparatus. The CD-R erasing apparatus is also formed with an insertion opening 4 to allow insertion of unnecessary CD-Rs into the CD-R erasing apparatus. On the side surface inside the CD-R erasing apparatus, there are a heat roller 5 having projections 9 through 11 for conducting heat therethrough as shown in FIGS. 3(a)–3(c), a pressure/driving roller 6 for transporting the inserted CD-Rs inside the apparatus while applying pressure in cooperation with the heat roller 5, a power supply 7 for supplying electrical energy to each part inside the apparatus, and a stocker 8 for stocking a predetermined number (for example about 50) of CD-Rs with destroyed data.

Now, the operation of the CD-R erasing apparatus will be described hereunder by reference to FIGS. 2 and 3(a)–3(c).

Firstly, the power switch 1 of the CD-R erasing apparatus is turned on for supplying electrical energy to each part in the apparatus from the power supply 7. The start switch 2 is turned on and unnecessary CD-Rs are inserted into the insertion opening 4. Within the CD-R erasing apparatus, the heat roller 5 and the pressure/driving roller 6 are in the stand-by condition. When an unnecessary CD-R is inserted into the CD-R erasing apparatus, the heat roller 5 and the pressure/driving roller 6 apply pressure to the CD-R. The heat roller 5 applies heat of 80° C. to 150° C. by way of the projections 9–11 as shown in FIGS. 3(a)–3(c). When the projections 9 through 11 contact the surface of the unnecessary CD-R, it is melted in such a manner that presence or absence of the initial data pits can not be distinguishable. Consequently, CD-Rs transported to the stocker 8 by the pressure/driving roller 6 shall have a void mark as shown in FIGS. 3(a)–3(c). Since stored data in the CD-Rs are completely destroyed in those with the void marks thereon, no one or no technology can read out the originally stored data.

Figure 3A:
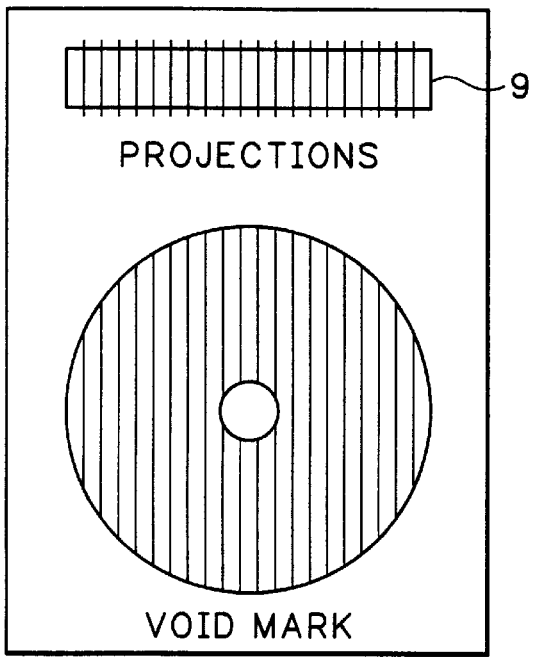
FIGS. 3(a)–3(c) illustrate projections and void marks formed by the projections.
Figure 3B:
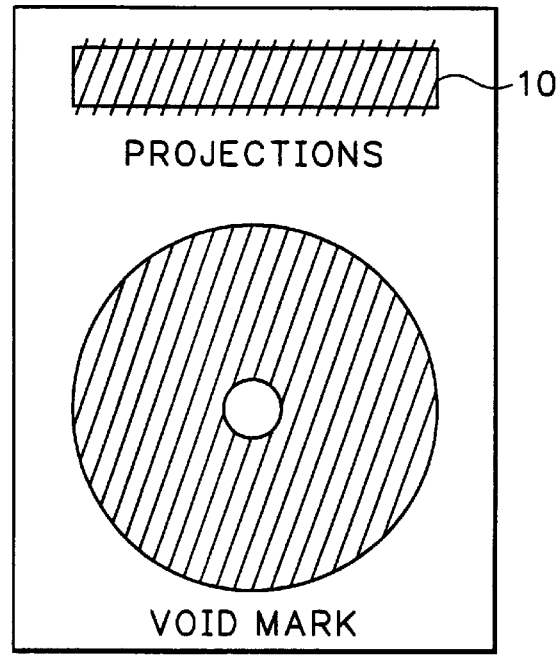
Figure 3C:
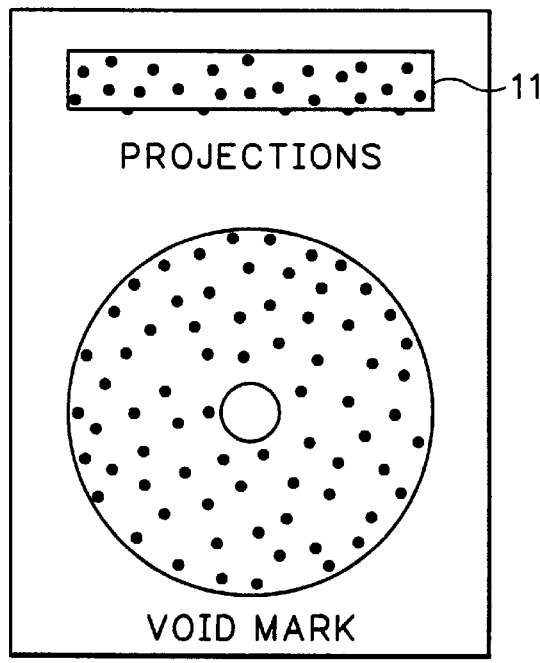
Figure 4:
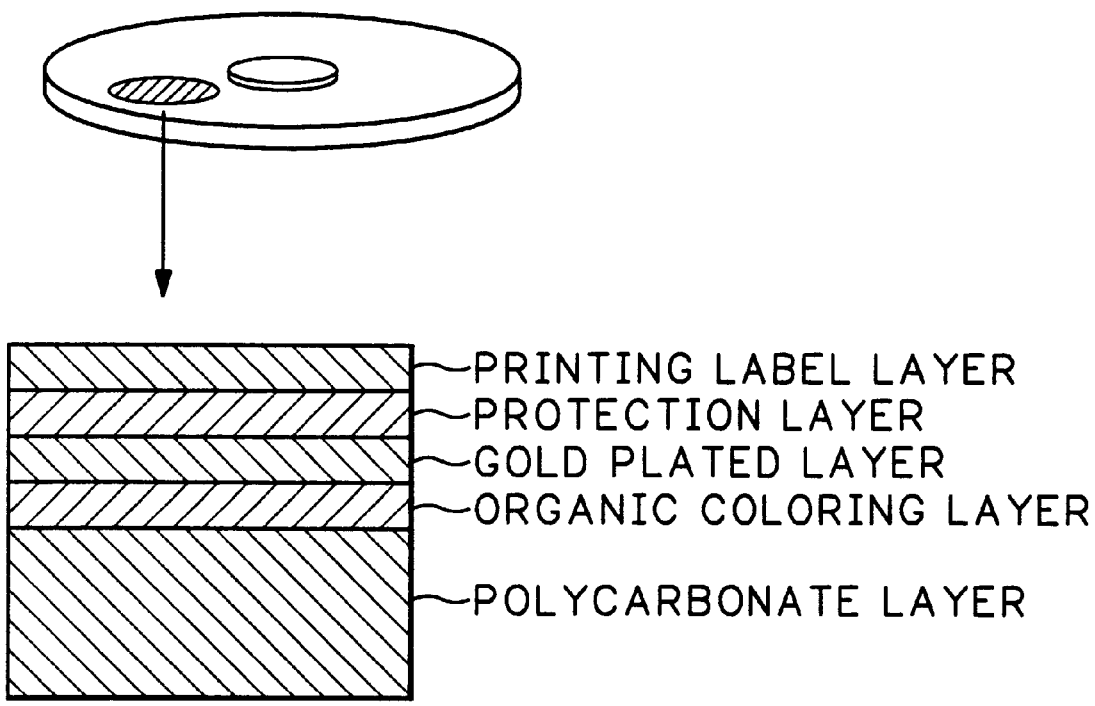
FIG. 4 illustrates configuration of a conventional CD-R.
Figure 5:
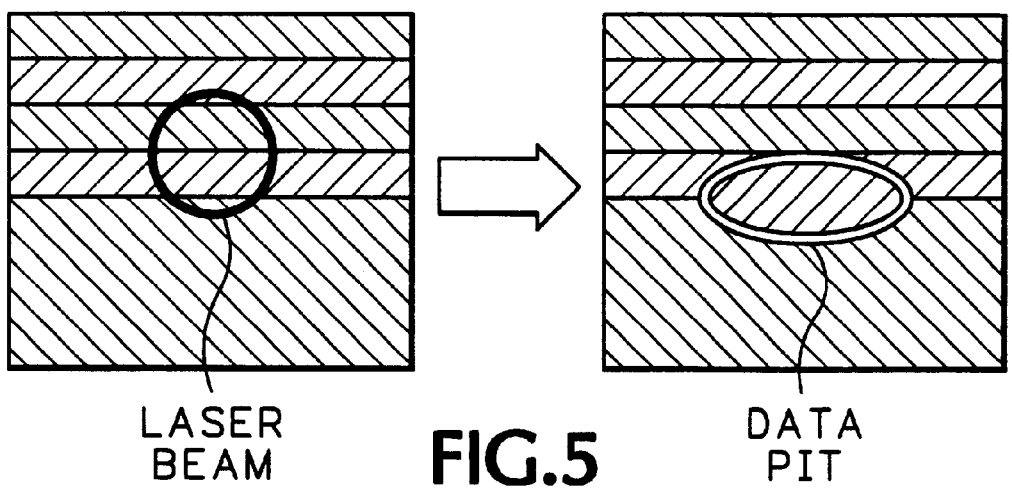
FIG. 5 illustrates conventional principle of recording data in a CD-R.

Although the heat roller 5 is described to have the projections 9–11 as shown in FIGS. 3(a)–3(c) in the above description, there is no need to have the projections 9–11 as shown in FIGS. 3(a)–3(c) in the above description, there is no need to have the projections 9 through 11 as shown in FIGS. 3(a)–3(c) if it is unnecessary to put the Void Mark as illustrated in FIGS. 3(a)–3(c). In summary, the heat roller 5 may be flat or any other configuration as long as the heat roller 5 can apply heat of 80° C. to 150° C.

As apparent from the above description, the CD-R erasing method and apparatus according to the present invention can destroy the data in unnecessary CD-Rs in a simple and less expensive manner. As a result, the user of CD-Rs need not fear leakage of proprietary data before disposing of unnecessary CD-RS.

Also, the CD-R erasing method and apparatus according to the present invention does not create dust or any other environmentally hazardous material in destroying unnecessary CDRS, thereby providing clean destroying of unnecessary data in CD-Rs.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A CD-R erasing method for destroying the data from the label surface of a CD-R by heating an unnecessary CD-R up to 80° C. to 150° C. by application of a heat roller to the readable surface of the CD-R, wherein said heat roller comprises projections that leave a pattern when applied to the CD-R.

2. A CD-R erasing apparatus, comprising:

an insertion opening for inserting an unnecessary CD-R into the apparatus;

a heat roller to apply heat of 80° C. to 150° C. wherein said heat roller comprises projections that leave a pattern when applied to the CD-R;

a pressure and driving roller in cooperation with said heat roller for carrying the inserted CD-R inside the apparatus while applying pressure;

a power supply for supplying electrical energy to various parts in the apparatus; and a stocker for storing CD-Rs with the stored data destroyed.

3. A CD-R erasing apparatus of claim 2, wherein said projections are formed in a ladder pattern.

4. A CD-R erasing apparatus of claim 2, wherein said projections are formed in a spiral pattern.

5. A CD-R erasing apparatus of claim 2, wherein said projections are formed in a spotted pattern.

6. The CD-R erasing method of claim 1 wherein said heat roller projections are in a pattern of a ladder.

7. The CD-R erasing method of claim 1 wherein said heat roller projections are in a spiral pattern.

8. The CD-R erasing method of claim 1 wherein said heat roller projections are in a spotted pattern.

* * * * *